INVENTOR.
THOMAS EVANS

United States Patent Office 3,444,673
Patented May 20, 1969

3,444,673
FEEDER DRIVE MECHANISM
Thomas Evans, Bettendorf, Iowa, assignor to J. I. Case Company, Racine, Wis., a corporation of Wisconsin
Continuation-in-part of application Ser. No. 551,720, May 20, 1966. This application Dec. 9, 1966, Ser. No. 600,489
Int. Cl. A01d 17/00
U.S. Cl. 56—1
6 Claims

ABSTRACT OF THE DISCLOSURE

A feeder drive mechanism for harvesters, and having a frame with lower feed rolls on the frame and upper feed rolls movable up and down. These lower and upper feed rolls are driven together, but the drive is at only one end of the rolls. A torsion mechanism is operatively connected relative to the upper rolls so that there will be uniform pressure exerted across upper rolls and of course at both ends of the upper rolls, relative to the crop material passing between the lower and upper rolls.

Background of the invention

This is a continuation-in-part of application Ser. No. 551,720, filed May 20, 1966 now abandoned.

The present invention relates to harvesters and more particularly to the feeding means and the drive mechanism therefor. The mechanism is an improved arrangement for driving the feed rolls of a forage harvester which arrangement provides for a certain amount of flexibility in the drive mechanism from one side of the machine. The drive mechanism is connected to one side of the feed rolls only and the disposition of these rolls is maintained evenly with a certain degree of flexibility by the use of a torque tube across the width of the machine.

Various drive arrangements have been used in harvesting machines for driving the feed rolls. The conventional harvester basically includes means for cutting standing crops and for conveying the cut stalk material to a position where it is chopped into small pieces by a rotary cutter and the small pieces are then delivered to a following wagon. An important step in this field harvesting is to provide a feeding means forward, or sideward in some machines, which helps control the amount and distribution of the cut stalk material being conveyed into the chopper. The feeding means must be constructed and positioned such that it will vary in disposition depending upon the amount of cut stalk material going through the machine at any one time. The throat of the feeding area is made to be limited from a minimum to a maximum and the feeding means must be adaptable to take care of the uneven amounts of material entering the chopping area. When less material is being conveyed to the cutter, the throat is normally at a minimum but if a wad or bunch of material is being conveyed, the feeding throat must be increased to admit and to properly feed this material to the chopper.

In the conventional machine, the feeding means includes two or more rollers which are adapted to move generally in an up-and-down direction as the amount of the entering material varies in the throat between the movable rolls and a fixed elevation roll or conveyor. One method of providing a two roll feed means is disclosed in U.S. Patent 2,629,978, issued to N. R. Krause et al. and assigned to applicant's assignee. However, this feed and drive arrangement is not entirely satisfactory for all types of forage material and certain improvements are desired in this type of machine.

The improved drive mechanism in the present invention utilizes a drive means positioned on one side of the machine to drive the feed rolls and a torsion means across the machine to maintain an even drive force on the feed rolls.

The principal object of the present invention is to provide a feeding means and a drive therefor which gives a certain amount of flexibility in the feeding area.

Another object is to provide a feed arrangement which tends to equalize the load over the material feed means.

A further object is to provide a mechanism which tends to exert forces evenly on the material feeding means across the feed opening.

Another object is to provide a torsional means disposed across the machine which will accomplish an effectively even distribution of forces on the feeding means.

Additional objects and advantages will become apparent from a reading of the following specification and the annexed drawings, in which.

Figure 1:
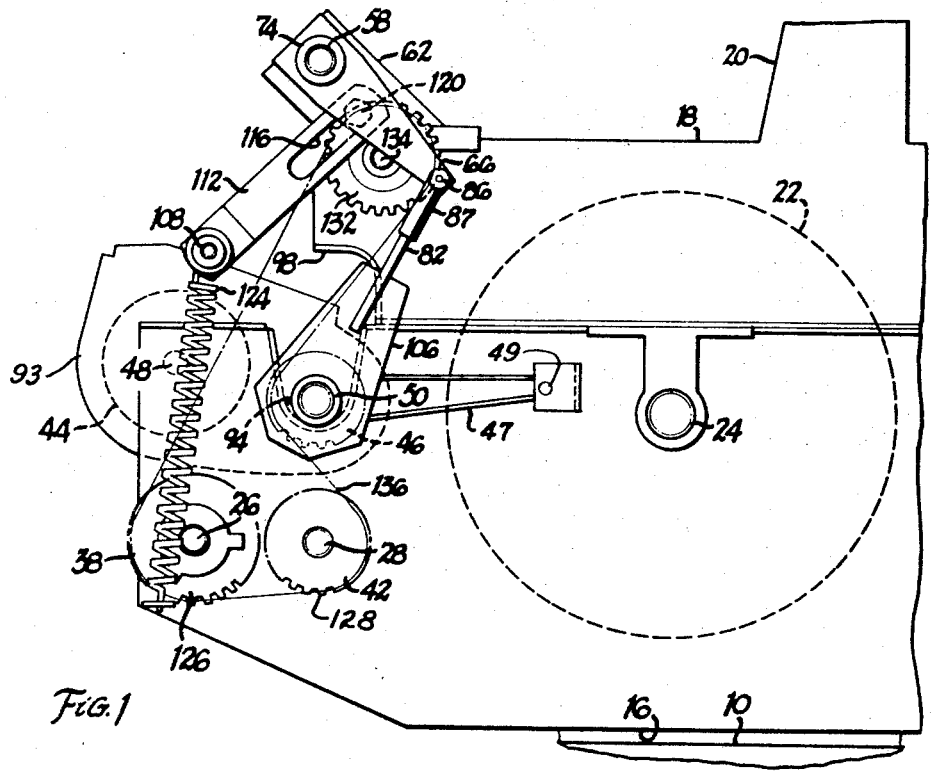
FIG. 1 is a side elevational view of part of a harvester showing the drive mechanism and the feed means.

As seen in FIG. 1, there is shown a part of the frame 10 of a harvester, the view being taken from the left side of the machine. The harvester is the type which cuts standing stalk material such as corn, conveys the stalk material between rollers which position the material for chopping by a multiblade rotary knife into small pieces and then, by the blowing action of the fast moving blades, throws the chopped material out of a spout, as shown in U.S. Patent No. 2,629,978. The machine includes, of course, right and left sides 12 and 14, a bottom portion 16 and a top portion 18, these sides and portions forming an enclosure through which the stalk material passes from the gathering mechanism (not shown) to the chopping knives and then to a delivery spout 20. The gathering mechanism and the conveying mechanism are conventional in that these may take the form of a row crop unit, a pickup unit or a cutter bar header unit; and chain, belt, or auger conveyor units may be provided to take the material into the area of the feed rolls to be fed into the chopper assembly 22. The chopper assembly includes a shaft 24 suitably supported in bearings at sides 12 and 14, and the shaft is driven by any suitable means.

The feeding means and the drive mechanism therefor include a forward shaft 26 and a rearward shaft 28, these shafts being positioned and disposed in the area to the front and lower part of the enclosure hereinbefore mentioned. Shafts 26 and 28, of course, extend transverse to the direction of travel of the machine and are supported at sides 12 and 14 for rotation in bearings 30 and 32 at right side 12 and in bearings 34 and 36 at left side 14. Shafts 26 and 28 have portions extending outwardly of side 14 which portions carry a drive means to be described later. Shaft 26 is the input drive for the feed rolls. Forward shaft 26 carries a feed roll 38 which extends substantially across the width of the enclosure and which is the first roll contacted by the stalk material as it is conveyed toward the chopper 22. Roll 38 has slots or corrugations 40 on the exterior thereof for grasping the stalk material and for further moving the material toward the chopper.

Figure 2:
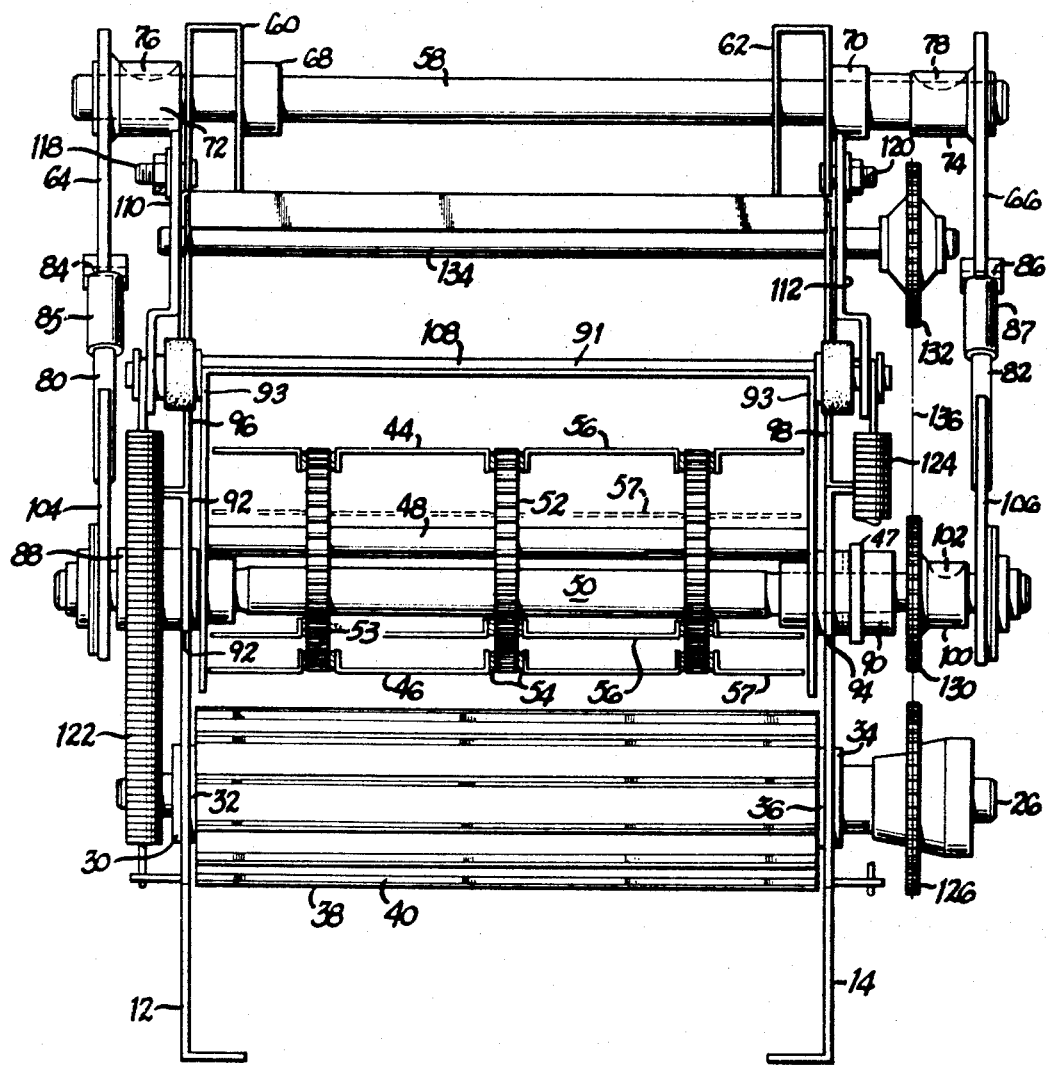
FIG. 2 is a front elevational view showing the feed mechanism and the torsional means.

The rearward shaft 28 carries a feed roll 42 which also extends substantially across the width of the enclosure. Roll 42 is defined as a smooth roll and is positioned so that the stalk material in passing over the roll is held at the proper disposition to be cut by the chopper. It is thus seen that the stalk material is conveyed and travels over the top of the rotating ralls 38 and 42. Forward shaft 26 extends to the left as viewed in the direction of travel and, as seen in FIG. 2, extends to the right. Rolls 38 and 42, being the lower feed rolls, are journaled in sides 12 and 14 and thus are substantially fixed in elevation so that the stalk material is moved over the rolls and fed at the proper angle into the chopping mechanism.

Figure 3:
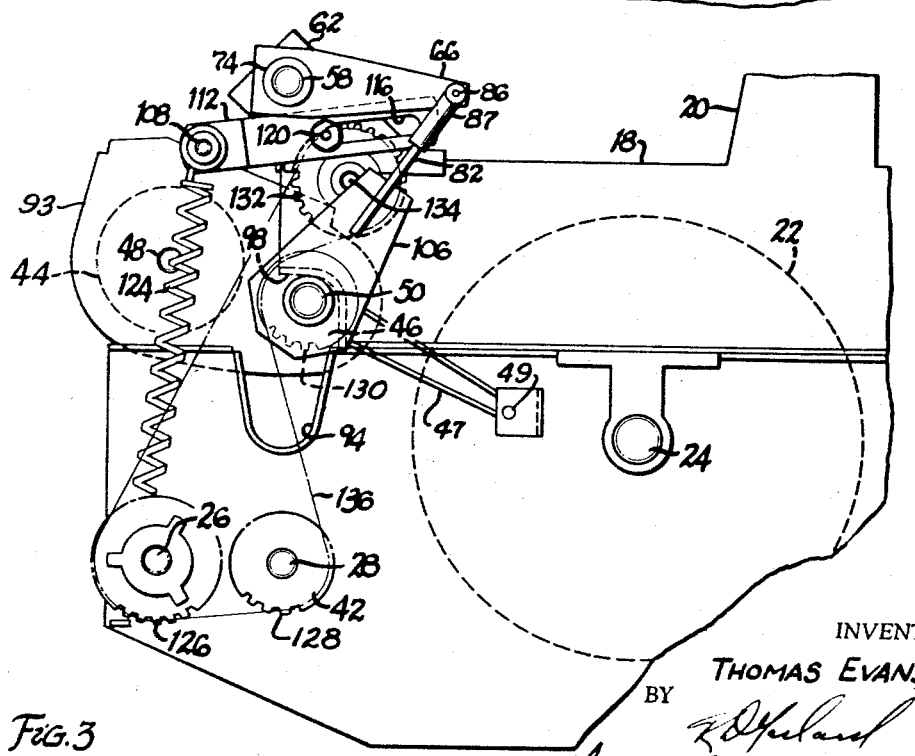
FIG. 3 is a side view showing the upper feed means in another position.

An upper feed means is provided which consists of a first roll 44 and a second roll 46, carried on shafts 48 and 50. Rolls 44 and 46 make up what is known as an apron drive or conveyor which is movable in a slight arc in an up-and-down direction depending upon the amount of stalk material passing through the machine. The up-and-down direction of the upper feed rolls is determined by the amount of crop material going through the machine at any one time and the limited amount of movement is shown in FIGS. 1 and 3. The positions which may be taken by the upper feed rolls are as shown, one being the lower position when little or no stalk material is being moved into the machine and the other showing the position of the feed rolls and connecting members 47 when the maximum amount of material is being moved into the machine. Members 47 are on opposite sides of the machine and each are pivotally connected at one end thereof to the machine on a pivot pin 49 fixed on each side 12 and 14. The other end of each member is connected to and supports shaft 50. Roll 44 comprises the shaft 48, which carries sprockets 52 and chains 54, there being feed bars 56 attached to chains 54. Roll 46 comprises the shaft 50, which carries sprockets 53 and also chains 54, there being feed bars 57 attached to chains 54. Shaft 50 is supported in bearings adjacent sides 12 and 14, as described later. However, it is to be understood that the upper feed roll shafts 48 and 50 must not be fixed in relation to shafts 26 and 28 so that the entire upper feed mechanism is free to move a limited amount in a generally up-and-down direction as shown in FIGS. 1 and 3.

The supporting and drive structure for the upper feed means will now be described. A torsional means or torque tube 58 is supported from members 60 and 62 across top portion 18 of the machine enclosure and which tube is generally parallel to the upper feed rolls. These members are fixed, as by welding, to the top portion and are disposed at the sides of the machine as shown in FIG. 2. Tube 58 extends beyond either side of the enclosure and the members 60 and 62, and, connected to the tube are torque arms 64 and 66 extending in a downwardly and rearwardly direction as shown in FIG. 1. Tube 58 is journaled in bearings 68 and 70, the bearing enclosure being fixed, as by welding, to members 60 and 62. Outwardly and to the sides of members 60 and 62 are couplings 72 and 74 to which are fixed torque arms 64 and 66. Keys 76 and 78 are utilized to prevent turning of tube 58 in couplings 72 and 74 when forces are exerted on torque arms 64 and 66 as will be more fully described. Arms 64 and 66 are pivotally connected to connecting links 80 and 82 on pins 84 and 86, as seen in FIGS. 1 and 3. A clevis type connection 85 and 87 is utilized between links 80 and 82 and pins 84 and 86. Shafts 50 carries connectors or bearings 88 and 90 which are positioned such that they are engageable with the sides 12 and 14, and are shown displaceable with a member 91 shown extending adjacent the sides 12 and 14 in spaced-apart portions 93, and providing a movable connection for shafts 48 and 50. Bearings 88 and 90 are also connected to one end of members 47. Members 47 and 91 provide support means for the upper feed roll. Sides 12 and 14 have lower stops 92 and 94 and upper stops 96 and 98, which will be further described. Adjacent to bearing 90 is a coupling 100 which is secured to shaft 50 by means of a key 102. Shafts 50 carries members or bearing arms 104 and 106 which are disposed in an upwardly and rearwardly direction as shown in FIGS. 1 and 3 and which are connected to links 80 and 82.

A rod or shaft 108 is connected at the top part of the upper feed means and has links 110 and 112 connected thereto, the links having elongated slots 114 and 116 at the ends thereof. Bolts 118 and 120 are connected to members 60 and 62 and are disposed within slots 114 and 116 such that as the upper feed means move up-and-down by virtue of variations of stalk material entering the machine, the bolts guide sliding of the links 110 and 112 through slots 114 nd 116 as the links 110 and 112 move with rod 108. Springs 122 and 124 are secured at one end to the machine frame and at the other end to shaft 108 to urge the upper feed means toward the lower feed means and to tend to keep the feed rolls compacting the stalk material as it enters the machine.

The positions of the upper feed rolls define the limits of the throat area from a minimum to a maximum, as stated above, and the upper feed rolls with connecting members 47 move in an arc in a generally up-and-down direction from the lower stops 92 and 94 to the upper stops 96 and 98.

As stated above, shaft 26 is driven from the main drive of the machine. As shown in FIG. 2, shaft 26 includes a drive sprocket 126 exterior of the machine enclosure and which drives the forward feed roll. A sprocket 128 is on shaft 28, the sprocket aligning with sprocket 126 for driving the rearward feed roll 42. The shaft 50 has a sprocket 130 fixed thereto through coupling 100 which is fixed to the sprocket 130 which is aligned with sprockets 126 and 128 and which drives the upper rear roll 46. An idler sprocket 132 is on a shaft 134 which is also journaled in suitable bearings in sides 12 and 14. An endless drive means or drive chain 136 engages sprockets 126, 128, 130 and 132 and drives the lower feed rolls and the upper feed rolls as seen in FIGS. 1 and 3.

It is thus seen that the lower feed rolls are relatively fixed in vertical position and that the upper feed rolls are movable in an up-and-down direction depending upon the amount of stalk material entering the machine.

The feed drive means includes a driving chain on one side of the machine and a torsion means interconnecting the ends of the upper feed rolls, so as to exert an equalized load across the feed rolls. The utilization of the torsion means provide a simple connection which permits driving the feed rolls from only one side of the machine and also to give a certain amount of flexibility in the upper feed rolls.

What is claimed as new and desired to be secured by Letters Patent of the United States is:

1. In a forage harvester drive mechanism, a frame having two opposite sides, lower feed rolls supported from said frame and being substantially fixed in relation to said frame, a support means on said frame and having a portion adjacent each of said opposite sides of said frame and being positioned to move in a generally up-and-down direction in relation to said lower feed rolls, a rotatably mounted upper feed roll having its opposite ends on said portions of said support means for up-and-down movement with said support means, drive means connected to said lower feed rolls at one end thereof and being drivingly connected to said upper feed rolls, the improvement comprising a torque tube rotatably mounted on said frame and extending between said two opposite sides of said frame in an axially fixed position thereon and having the opposite ends of said tube respectively connected to said opposite ends of said upper feed roll for exerting substantially equal forces across said upper feed roll.

2. The subject matter of claim 1, including links slidable on said frame and operatively connected with said uppper feed roll for up-and-down movement with said upper feed roll, and biasing means connected to said links for yielding urging said upper feed roll toward said lower feed roll.

3. The subject matter of claim 1, including an axially fixed rotation bearing interposed between each of said two opposite sides of said frame and each of said ends of said torque tube for rotational mounting of said torque tube for the torsional action of said torque tube, a rotation bearing on each said end of said upper feed roll and interposed between said upper feed roll and said support means for rotational mounting of said upper feed roll.

4. The subject matter of claim 3, including an articulate connector inter-connected between each of said tube ends to rotate therewith, and said bearing on said upper feed roll ends for transmitting to said tube ends the up-and-down movement of said support means but in rotary motion for the torsion forces effective in said tube.

5. The subject matter of claim 1, including a second upper feed roll having its opposite ends connected with said opposite ends of the first said upper feed roll for up-and-down movement with said support means, and said support means being rigid between said opposite ends of both said upper feed rolls.

6. The subject matter of claim 1, wherein said support means includes pivot arms connected to said bearings of said upper feed rolls.

References Cited

UNITED STATES PATENTS 2,775,991    1/1957    Elliott _____ 146—120 XR
3,282,404    11/1966    Corwith et al.

ANTONIO F. GUIDA, *Primary Examiner.*

U.S. Cl. X.R.

146—120